(12) United States Patent
MacLellan et al.

(10) Patent No.: US 6,910,145 B2
(45) Date of Patent: Jun. 21, 2005

(54) DATA TRANSMISSION ACROSS ASYNCHRONOUS CLOCK DOMAINS

(75) Inventors: Christopher S. MacLellan, Walpole, MA (US); Gregory S. Robidoux, Westboro, MA (US); John K. Walton, Mendon, MA (US); Kendell A. Chilton, Southboro, MA (US)

(73) Assignee: EMC Corporation, Hopkinton, MA (US)

( * ) Notice: Subject to any disclaimer, the term of this patent is extended or adjusted under 35 U.S.C. 154(b) by 742 days.

(21) Appl. No.: 10/021,949

(22) Filed: Dec. 13, 2001

(65) Prior Publication Data

US 2003/0159081 A1 Aug. 21, 2003

(51) Int. Cl.$^7$ .............................................. G06F 13/00
(52) U.S. Cl. ..................... 713/400; 713/401; 370/503; 370/545; 375/371; 711/114; 711/152
(58) Field of Search ............................... 713/400, 401; 370/503, 545; 375/371; 711/152, 114

(56) References Cited

U.S. PATENT DOCUMENTS

| | | | | | |
|---|---|---|---|---|---|
| 5,077,698 | A | * | 12/1991 | Beauducel | 367/79 |
| 5,255,293 | A | * | 10/1993 | Archer et al. | 375/372 |
| 5,799,175 | A | * | 8/1998 | Cassiday et al. | 713/400 |
| 5,968,180 | A | * | 10/1999 | Baco | 713/400 |
| 6,055,285 | A | * | 4/2000 | Alston | 375/372 |
| 6,263,448 | B1 | * | 7/2001 | Tsern et al. | 713/501 |
| 6,424,688 | B1 | * | 7/2002 | Tan et al. | 375/354 |
| 6,549,593 | B1 | * | 4/2003 | Rumreich et al. | 375/354 |
| 6,578,126 | B1 | * | 6/2003 | MacLellan et al. | 711/167 |
| 6,636,933 | B1 | * | 10/2003 | MacLellan et al. | 710/317 |
| 6,658,495 | B1 | * | 12/2003 | Yoshitake | 710/5 |
| 6,765,932 | B1 | * | 7/2004 | Santahuhta | 370/503 |
| 6,804,794 | B1 | * | 10/2004 | Robidoux et al. | 714/5 |

* cited by examiner

Primary Examiner—A. Elamin
(74) Attorney, Agent, or Firm—Krishnendu Gupta; John M. Gunther (57) ABSTRACT

In one embodiment of the present invention, a system is provided for use in transmitting data and related control information from a first clock domain to a second clock domain. The system may include a first logic section that may generate respective identification information that may be used to identify respective types of information represented by respective data and related control information. The system may also include memory that may receive and store, at a first clock rate used in the first clock domain, the respective data and related control information. The memory also may store, in association with the respective data and related control information, the respective identification information. The memory may be configured to permit the retrieval, at a second clock rate used in the second clock domain, of the respective data, the respective related control information, and the respective identification information stored in the memory.

20 Claims, 5 Drawing Sheets

DATA TRANSMISSION ACROSS ASYNCHRONOUS CLOCK DOMAINS

FILED OF THE INVENTION

The present invention relates to a novel and non-obvious technique that may be used to facilitate transmission of data across asynchronous clock domains.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the trade name Symmetrix™ (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back-end" I/O controllers/directors) that may store user data in, and retrieve user data from a shared cache memory resource in the subsystem. A plurality of host controllers (commonly referred to as "front-end" I/O controllers/directors) also may store user data in and retrieve user data from the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments. In each of the memory boards, the majority of the internal circuitry is configured to process parallel control and data words.

It has been proposed to configure the shared cache memory resource to use serial bit stream transmission to exchange user data and related control information (e.g., comprising address and memory command information, etc.) with the host controllers and disk controllers. In order to be able to implement this, it would be necessary to provide in each memory board respective circuitry to convert into corresponding parallel words the serial bit stream transmissions received by the memory board from host and disk controllers. For this purpose, it has been proposed to use, in each respective cache memory board conventional "off-the-shelf" discrete integrated circuit (IC) chips comprising serial-to-parallel converter circuitry that may be configured to convert into corresponding parallel words the serial bit stream transmissions received by the respective memory board. The internal control circuitry in the respective memory board may be configured to examine these parallel words, determine therefrom the respective portions of user data and related control information embedded therein, forward the respective parallel words of user data to a first-in-first-out (FIFO) memory for later processing, decode the related control information, and cause the parallel words of user data to be processed by the respective memory board in accordance with the related control information.

In a respective memory board, the rate at which a respective serial bit stream may be received and processed by the respective serial-to-parallel converter circuitry, and the rate at which the parallel words of user data may be stored in the FIFO memory, may be governed by a first clock signal generated in the host or disk controller and used to generate the bit stream, but the rate at which the respective memory board's internal control circuitry may seek to retrieve the parallel words of user data from the FIFO may be governed by a second clock signal generated inside the respective memory board. Thus, the respective rates at which the FIFO may be filled with, and emptied of, user data may be different.

In order to try to prevent the FIFO memory from filling too quickly (and thereby possibly overwriting valid user data that has yet to be retrieved from the FIFO by the memory board's control circuitry), or emptying too quickly (and thereby possibly causing the same user data to be retrieved twice by the control circuitry), a relatively complex, "elastic" FIFO buffer memory may be employed as the FIFO memory in the serial-to-parallel converter circuitry. This elastic FIFO buffer memory may be configured to receive and store, at a rate governed by the first clock signal, the parallel words of user data generated by the converter circuitry. The elastic FIFO memory may also be configured to permit the parallel words of user data stored therein to be retrieved therefrom by the memory board's internal control circuitry at a rate governed by the second clock signal.

The elastic FIFO/buffer memories used in such conventional serial-to-parallel converter circuitry typically comprise relatively complex circuitry, may require undesirably large amounts of processing overhead to carry out their respective operations, and may introduce sources of potential unreliable processing behaviors into the cache memory resource. Also, the presence in a respective memory board of the discrete IC chips that comprise such conventional serial-to-parallel converter circuitry introduces into the respective memory board another stage, or hop, that the user data and related control information must propagate through when the data and related control information move from the host/disk controllers to the respective memory board's internal circuitry; this may increase latency in moving data and related control information from the host/disk controllers to the respective memory board's internal control circuitry, and reduce the efficiency of transfers of user data and related control information from the host/disk controllers to the respective memory board's internal control circuitry.

Accordingly, it would be desirable to eliminate the need to use, in the respective memory boards of the shared cache memory resource, the aforesaid type of discrete IC chips that comprise such conventional serial-to-parallel converter circuitry (and in particular, the elastic FIFO memories comprised in such conventional serial-to-parallel converter circuitry) while still permitting the host/disk controllers to transmit user data and related control information to such memory boards using serial bit streams.

SUMMARY OF THE INVENTION

The present invention provides a technique that may be used to facilitate transmission and processing of data and related control information that when practiced in a network data storage system, may permit the system to be able to overcome the aforesaid and other disadvantages and drawbacks of the prior art. One embodiment of the present invention may be practiced in the control and internal network circuitry in a memory board in a shared cache memory resource in a network data storage system. According to this embodiment of the present invention, a system may be provided that may be used to transmit user data and related control information from a first processing section to a second processing section in such control and internal network circuitry in the memory board. The first processing section may be in a first clock domain (e.g., governed by or using a first clock signal having a first clock rate), and the second processing section may be in a second clock domain (e.g., governed by or using a second clock signal having a second clock rate). The first processing section includes circuitry that may convert one or more serial bit streams from a host/disk controller into corresponding parallel words of user data and related control information. The system of this embodiment of the present invention, the first processing section, and the second processing section may be comprised in an application specific integrated circuit (ASIC) that may be comprised in the control and internal network circuitry in the memory board.

The system of this embodiment of the present invention may include a first logic section and computer-readable memory (e.g., non-elastic FIFO buffer memory of fixed size, depth, and width). The first logic section may generate respective identification information that may be associated with and used to identify respective types of information represented by respective user data and respective related control information (e.g., identifying whether the information being identified by the respective identification information constitutes respective user data, respective address information, a respective command to be executed by the memory board, etc.).

The non-elastic FIFO memory may receive and store, at the first clock rate used in the first clock domain, the respective data and the respective related control information, and also may store, in association with the respective data and the respective related control information, the respective identification information generated by the first logic section, which respective identification information may be used to identify the respective types of information represented by the respective user data and the respective related control information stored in the memory. The non-elastic FIFO memory may be configured to permit the retrieval (e.g., by a second logic section in the second processing domain), at the second clock rate used in the second clock domain, of the respective user data, the respective related control information, and the respective identification information stored in the non-elastic FIFO memory.

The respective user data, as and when stored in the non-elastic FIFO memory, may be concatenated with the respective identification information that identifies the respective type of the information represented by the respective user data, in order to facilitate association of the respective user data with such respective identification information. Similarly, the respective related control information, as and when stored in the non-elastic FIFO memory, may be concatenated with the respective identification information that identifies the respective type of information represented by the respective related control information, in order to facilitate association of the respective related control information with such respective identification information. The second logic section in the second clock domain may be configured to determine, based upon the respective identification information that it retrieves from the non-elastic FIFO memory, respective further processing to be performed by the memory board involving the respective user data and the respective control information associated with it in the non-elastic FIFO memory. The first processing section includes at least one converter that may convert at least one serial bit stream into parallel words that may comprise the respective data and the respective related control information. Alternatively, the first processing section may include a plurality of converters that may convert respective serial bit streams into the parallel words that may comprise the respective user data and the respective related control information.

The plurality of converters may comprise a first converter and a second converter. The first processing section may also include retimer circuitry that may be used to synchronize, based upon the first clock rate used in the first clock domain, the transmission of the parallel words to the memory. The retimer circuitry may comprise a first retimer circuit and a second retimer circuit. The first retimer circuit may be coupled to the first converter. The second retimer circuit may be coupled to the second converter.

The first converter may receive a first serial bit stream, and the second converter may receive a second serial bit stream. The first converter may be configured to generate, based upon the first bit stream, one clock signal, and the second converter may be configured to generate, based upon the second bit stream, another clock signal.

Advantageously, it has been found that by practicing this embodiment of the present invention in a shared cache memory resource of a network data storage system, it is possible to eliminate the need to use, in the respective memory boards of the shared cache memory resource, the aforesaid type of discrete IC chips that comprise the aforesaid type of conventional serial-to-parallel converter circuitry (and, in particular, the elastic FIFO memories used in such conventional circuitry), while still permitting the host/disk controllers of the data storage system to transmit user data and related control information to such memory boards using serial bit streams. These and other features and advantages of various embodiments of the present invention will become apparent as the following Detailed Description proceeds and upon reference to the Figures of the drawings, wherein like numerals depict like parts, and in which:

Although the following Detailed Description will proceed with reference being made to illustrative embodiments and methods of use of the present invention, it should be understood that it is not intended that the present invention be limited to these illustrative embodiments and methods of use. On the contrary, many alternatives, modifications, and equivalents of these illustrative embodiments and methods of use will be apparent to those skilled in the art. For example, although the subject invention will be described as being used to advantage in network data storage systems, and in particular, in cache memory circuitry used in such systems, the subject invention may be advantageously used in other types of systems and circuitry, including other types of in other systems used in communications networks and/or memory circuitry in which data may be transferred across asynchronous clock domains. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
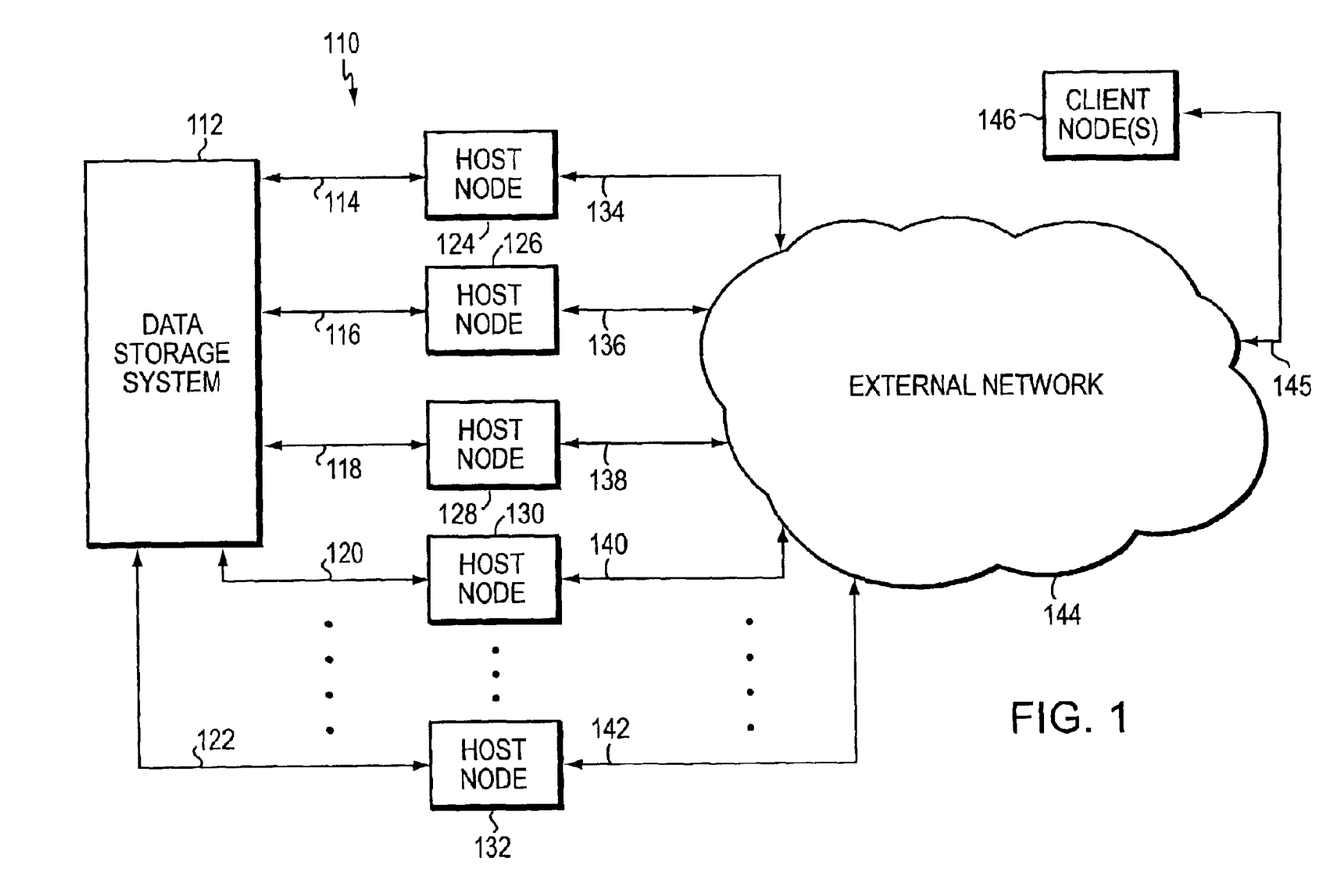
FIG. 1 is a high-level schematic block diagram of a data storage network that includes a network data storage system wherein one embodiment of the present invention may be practiced to advantage.

Turning now to the Figures, illustrative embodiments of the present invention will be described. FIG. 1 is a high-level block diagram illustrating a data storage network 110 that includes a network data storage system 112 wherein one embodiment of the subject invention may be practiced to advantage. System 112 is coupled via communication links 114, 116, 118, 120, . . . 122 to respective host computer nodes 124, 126, 128, 130, . . . 132. Each of the communication links 114, 116, 118, 120, . . . 122 may be configured for communications involving a respective conventional network communication protocol (e.g., FC, ESCON, SCSI, Fibre Connectivity, Gigabit Ethernet, etc.). Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well-known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates the exchange of data and commands among the nodes 124, 126, 128, 130, . . . 132 and the system 112 via the communication links 114, 116, 118, 120, . . . 122, in the manner that will be described below.

Figure 2:
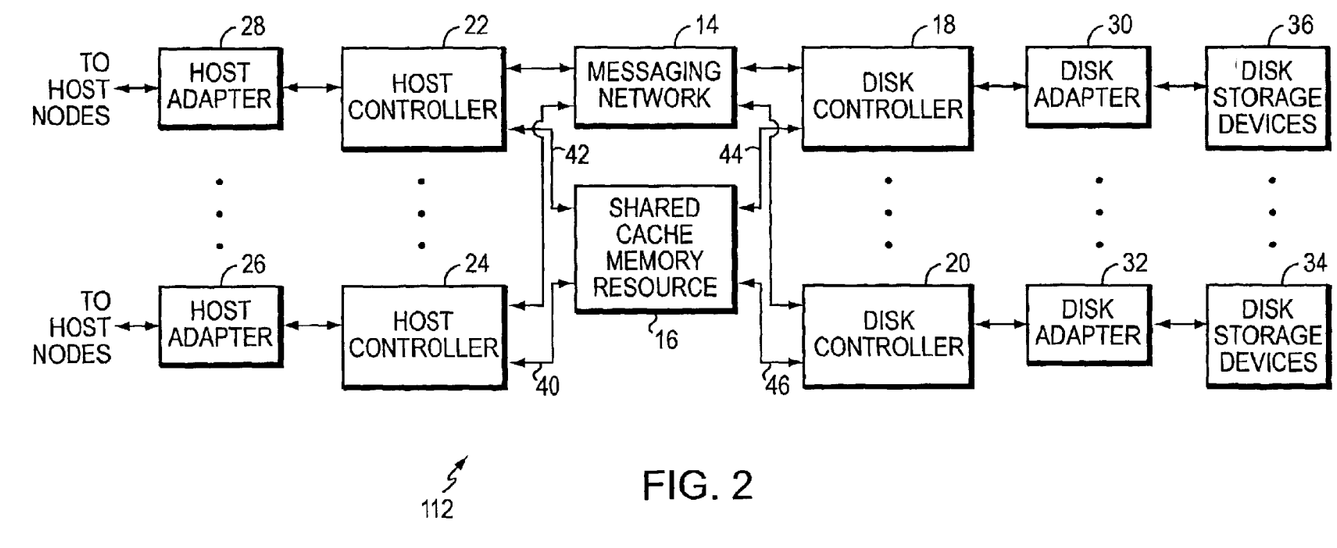
FIG. 2 is a high-level schematic block diagram illustrating functional components of the data storage system included in the data storage network shown in FIG. 1.

FIG. 2 is a high-level schematic block diagram of functional components of the system 112. System 112 includes a plurality of host adapters 26 . . . 28, a plurality of host controllers 22 . . . 24, a message network or system 14, a shared cache memory resource 16, a plurality of disk controllers 18 . . . 20, a plurality of disk adapters 30 . . . 32, and sets of disk storage devices 34 . . . 36. In system 112, the host controllers and disk controllers are coupled to individual memory boards (See FIGS. 3 and 4) comprised in the cache memory 16 via a point-to-point data transfer network system that comprises a plurality of network links. For example, host controllers 22 and 24 are coupled to the cache memory resource 16 via respective pluralities of point-to-point data transfer network links 42 and 40 comprised in the point-to-point data transfer network system. Similarly, the disk controllers 18 and 20 are coupled to the cache memory resource 16 via respective pluralities of point-to-point data transfer network links 44 and 46 comprised in the point-to-point data transfer network system.

In this embodiment of system 112, although not shown explicitly in the Figures, depending upon the particular communication protocols being used in the respective links 114, 116, 118, 120, . . . 122, each host adapter 26 . . . 28 may be coupled to multiple respective host nodes. For example, in this embodiment of system 112, if the links 114, 116, 118, 120 are FC communication links, adapter 26 may be coupled to host nodes 124, 126, 128, 130 via links 114, 116, 118, 120, respectively. It should be appreciated that the number of host nodes to which each host adapter 26 . . . 28 may be coupled may vary, depending upon the particular configurations of the host adapters 26 . . . 28, and host controllers 22 . . . 24, without departing from this embodiment of the present invention. In network 110, host adapter 26 provides network communication interfaces via which the host controller 24 may exchange data and commands, via the links 114, 116, 118, 120, with the host nodes 124, 126, 128, 130, respectively.

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of magnetic and/or optical disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may forward a message, via the messaging network 14, to the disk controller (e.g., controller 18) associated with the storage devices 36 within which the requested data is stored, requesting that the disk controller 18 retrieve the requested data into the cache 16.

In response to the message forwarded from the host controller 24, the disk controller 18 may forward via the disk adapter 30 to which it is coupled appropriate commands for causing one or more of the disk devices 36 to retrieve the requested data. In response to such commands, the devices 36 may forward the requested data to the disk controller 18 via the disk adapter 30, and the disk controller 18 may transfer via one or more of the links 44 the requested data for storage in the cache 16. The disk controller 18 may then forward via the network 14 a message advising the host controller 24 that the requested data has been stored in the cache 16.

In response to the message forwarded from the disk controller 18 via the network 14, the host controller 24 may retrieve the requested data from the cache 16 via one or more of the links 40, and may forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially transfer, via one or more of the links 40, the data associated with the request for storage in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Figure 3:
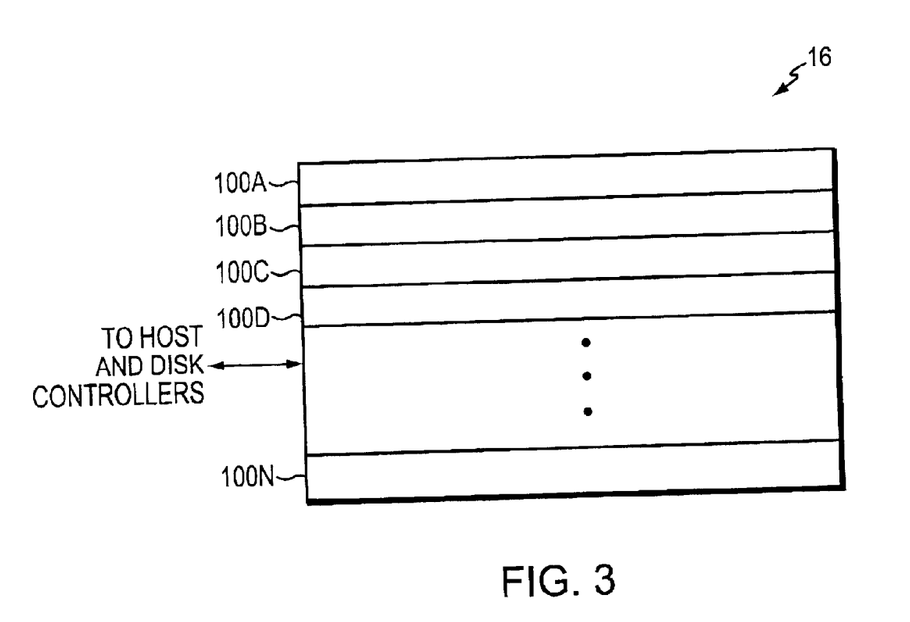
FIG. 3 is a high-level schematic block diagram illustrating functional components of the shared cache memory resource in the data storage system of FIG. 2.
Figure 4:
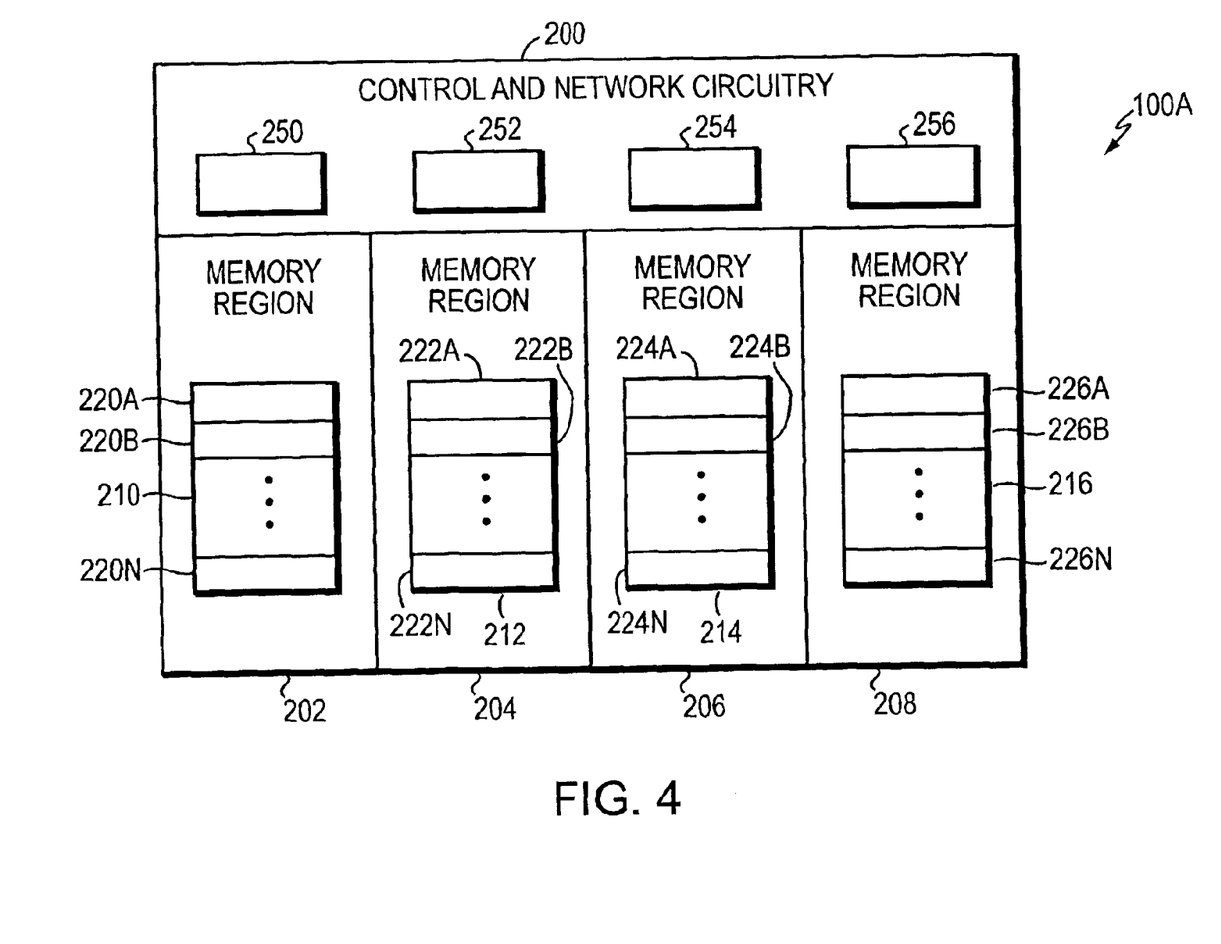
FIG. 4 is a high-level schematic block diagram illustrating functional components of a memory board that may be comprised in the shared cache memory resource of FIG. 3.

With particular reference being made to FIGS. 3–4, memory system 16 comprises a plurality of electrical circuit boards or cards 100A, 100B, 100C, 100D . . . 100N that may be coupled to an electrical backplane (not shown) in system 112. When coupled to this backplane, the memory boards 100A, 100B, 100C, 100D . . . 100N may become electrically connected via electrical circuit traces in the backplane to other components of system 112, such that the boards 100A, 100B, 100C, 100D . . . 100N may communicate and interact with each other and the host and disk controllers in system 112 in the manner described herein. It is important to note that the number of memory boards shown in FIG. 3 is merely illustrative, and depending upon the configuration of the system 112, the actual number of memory boards that may be comprised in the system 112 may vary. The construction and operation of each of the memory boards 100A, 100B, 100C, 100D . . . 100N are essentially identical; accordingly, in order to avoid unnecessary duplication of description, the construction and operation of one memory board 100A are described herein.

FIG. 4 is a high-level logical schematic representation of pertinent functional components of memory board 100A. Board 100A comprises control and network circuitry 200, and a plurality of memory regions 202, 204, 206, and 208. Each of the memory regions 202, 204, 206, and 208 comprises a respective plurality of banks of SDRAM IC devices. For example, region 202 comprises a plurality of banks of SDRAM IC devices (collectively referred to by numeral 210); region 204 comprises a plurality of banks of SDRAM IC devices 212; region 206 comprises a plurality of banks of SDRAM IC devices 214; and, region 208 comprises a plurality of banks of SDRAM IC devices 216. The respective pluralities of SDRAM IC devices comprised in each of the banks 210, 212, 214, and 216 are configured so as to comprise respective pluralities of memory segments of predetermined size (e.g., 256 megabytes each) in memory system 16. In this embodiment of the present invention, each of the memory segments may have a different base memory address independent of the other memory segments within the same memory region. More specifically, the SDRAM IC devices in memory banks 210 are configured so as to comprise memory segments 220A, 220B, . . . 220N; the SDRAM devices in memory banks 212 are configured so as to comprise memory segments 222A, 222B, . . . 222N; the SDRAM devices in memory banks 214 are configured so as to comprise memory segments 224A, 224B, . . . 224N; and, the SDRAM devices in memory banks 216 are configured so as to comprise memory segments 226A, 226B, . . . 226N. It should be noted that the respective number of memory regions comprised in board 100A, as well as, the numbers and sizes of the memory segments comprised in such regions may vary without departing from this embodiment of the present invention. For example, in this embodiment of the present invention, the memory regions may comprise respective integer numbers of memory segments that may vary between 2 and 64, inclusive.

In each respective memory segment, the data stored therein may be further segmented into respective pluralities of 64-bit data words. Individual data words may be grouped into stripe units of 64 words each, and the stripe units may be striped across the respective memory regions in each respective memory board.

It should be appreciated that each of the SDRAM IC devices comprised in the cache 16 is a semiconductor memory device, and these SDRAM IC devices may be used by the cache 16 to store user data forwarded to the cache 16 from the host controllers and the disk controllers in system 112. The cache memory system 16 is a semiconductor memory system, as distinguished from the disk storage devices 34 . . . 36 comprised in the system 112, and the memory regions and memory segments comprised in the memory system 16 are semiconductor memory regions and semiconductor memory segments, respectively.

In general, control and network circuitry 200 comprises logic network and control logic circuitry (not shown) that may facilitate, among other things, exchange of data and commands among the memory regions 202, 204, 206, and 208 and the host controllers and disk controllers via the point-to-point links (e.g., links 40, 42, 44, and 46). More specifically, the control logic circuitry in circuitry 200 may include memory region controllers (not shown) that may control, among other things, the storing of data in and retrieval of data from the memory regions 202, 204, 206, and 208. As is described below, the logic network circuitry in the circuitry 200 may include crossbar switching and associated point-to-point network circuitry (hereinafter referred to as "crossbar switching circuitry") and serial-to-parallel converter circuitry. The serial-to-parallel converter circuitry may be configured to, among other things, convert serial bit streams of information received from the host controllers and disk controllers via the links 40, 42, 44, and 46 into corresponding parallel words, and forward the parallel words for additional processing by other circuitry in the control and network circuitry 200, in the manner that is described below. The serial-to-parallel converter circuitry may also be configured to convert parallel words received from the crossbar switching circuitry into corresponding serial bits streams of information for forwarding to appropriate host and disk controllers via the links 40, 42, 44, and 46 associated with such appropriate controllers.

Broadly speaking, the types of information that may be contained in the serial bit streams may include, e.g., predetermined sequences of user data and related control information (e.g., comprising certain types of address information, commands, cyclical redundancy check information, signaling semaphores, and "tag" information indicating, among other things, the memory board in the cache 16 and the memory region in that memory board where the data is to be stored/read, the host or disk controller that initiated the data transfer associated with the data, etc). That is, respective predetermined sequences of user data and certain types of related control information may be associated with predetermined memory operations that may be commanded by host controllers and disk controllers and executed by the memory board 100A, in accordance with a predetermined data exchange and memory control protocol implemented in system 112. The particular sequence of user data and related control information transmitted by a particular host/disk controller to, and received by, memory board 100A may be associated with, and cause the memory board 100A to execute, a particular memory operation command embodied in the sequence. Details concerning the types of related control information that may be used in accordance with this embodiment of the present invention, as well as, the data exchange and memory control protocol that may be used in the system 112 to facilitate exchange of user data and related control information among the host and disk controllers and the cache memory 16 by causing the cache memory 16 to execute such commands, may be found in e.g., commonly-owned, U.S. patent application Ser. No. 09/745,814 entitled, "Data Storage System Having Crossbar Switch With Multi-Staged Routing," filed Dec. 21, 2000 now U.S. Pat. No. 6,636,933; this co-pending U.S. Patent Application is hereby incorporated by reference herein in its entirety.

The crossbar switching circuitry in memory board 100A may include a crossbar switch network and an associated point-to-point network. This point-to-point network may include a plurality of point-to-point interconnections or links that may couple respective ports of the crossbar switch network to respective ports of the memory region controllers. The crossbar switch network may be configured to receive a respective parallel word of user data provided from the serial-to-parallel converter circuitry in the board 100A, and to forward the respective parallel word of user data, in accordance with associated parallel words of related control information provided from the converter circuitry, via an appropriate point-to-point interconnection in the point-to-point network in board 100A to a port of an appropriate memory region controller (e.g., a memory region controller associated with a memory region in board 100A specified in the associated parallel words of related control information).

Each memory region controller may issue commands, responsive to related control information that it receives via the point-to-point network in board 100A, to a respective one (e.g., region 202) of the memory regions 202, 204, 206, and 208 with which it is associated. These commands may cause, among other things, the region 202 to store user data in the memory banks 210, or to retrieve stored user data from the memory banks 210. Such retrieved user data may be forward by the memory region controller, via the point-to-point network in the board 100A to the crossbar switch network, and thence through the serial-to-parallel converter circuitry, to an appropriate host or disk controller via one of the links 40, 42, 44, and 46.

Although not shown in Figures, it should be noted that, in actual implementation of board 100A, portions of the circuitry 200 may be distributed in the regions 202, 204, 206, and 208 (e.g., circuitry for providing relatively low level commands/signals to actual SDRAM IC devices in the region, such as, chip select, clock synchronization, memory addressing, data transfer, memory control/management, clock enable signals, etc.), however, for purposes of the present discussion, this circuitry may be thought of as being logically comprised in the circuitry 200. Further details and description of the types and functions of circuitry 200 that may be distributed in the regions 202, 204, 206, and 208 in actual implementation of board 100A may be found in e.g., commonly-owned, U.S. patent application Ser. No. 09/796,259, filed Feb. 28, 2001 now U.S. Pat. No. 6,804,794, entitled "Error Condition Handling"; said co-pending U.S. Patent Application is hereby incorporated by reference herein in its entirety.

Portions of the respective control and network circuitry of the respective memory boards 100A, 100B, 100C, 100D . . . 100N may be embodied as application specific integrated circuits (and related circuitry) that may be pre-programmed with specific algorithms whose execution may permit the respective control and network circuitry to be able to carry out the procedures, processes, techniques, operations, and functions that are described above as being carried by such control and network circuitry. For example, for purposes of illustration, the network and control circuitry 200 in board 100A may include a respective plurality of such application specific integrated circuits 250, 252, 254, and 256. It is important to note that that number of application specific circuits 250, 252, 254, and 256 shown in FIG. 4 is merely for illustrative purposes and, in actual implementation of system 112, the actual number of application specific integrated circuits comprised in circuitry 200 may vary without departing from this embodiment of the present invention.

In this embodiment of the circuitry 200, each of the application specific integrated circuits 250, 252, 254, and 256 may have an identical respective construction and operation, and accordingly, in order to avoid unnecessary duplication herein, the respective construction and operation of only one such ASIC 250 will be described. ASIC 250 may comprise, among other things, portions of the crossbar switching and serial-to-parallel converter circuitry that was previously described as being comprised in the control and network circuitry 200. For example, in accordance with this embodiment of the present invention, among other circuitry that may be comprised in the ASIC 250, the ASIC 250 may comprise the circuitry 300 shown in FIG. 5.

Circuitry 300 includes a first processing section 301 and a second processing section 303. The first processing section 301 is comprised in a first clock domain (i.e., clock domain A shown in FIG. 5), and the second processing section 303 is comprised in a second, different clock domain (i.e., clock domain B shown in FIG. 5).

Figure 5:
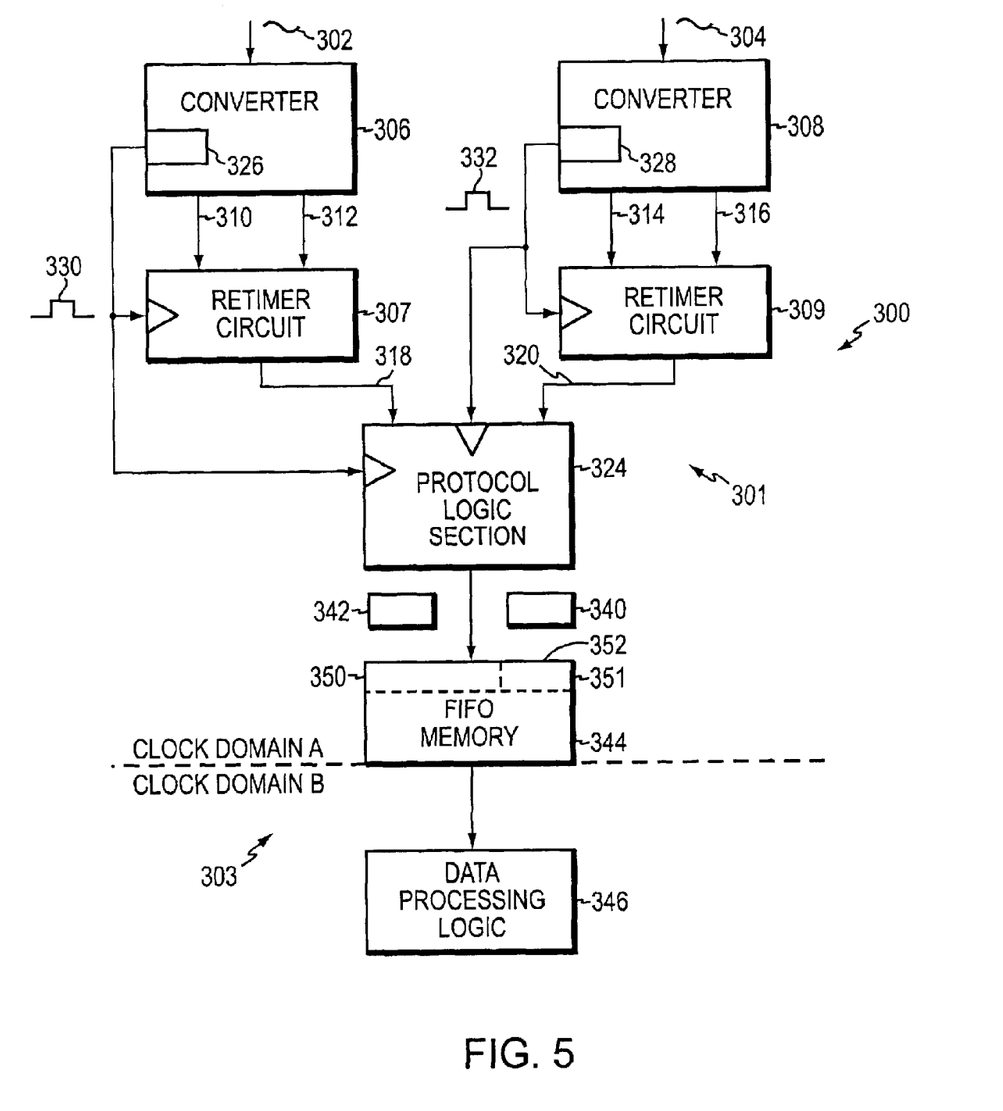
FIG. 5 is high-level schematic block diagram illustrating functional components of a portion of the control and network circuitry, made in accordance with an embodiment of the present invention, that may be comprised in the memory board of FIG. 4.

The first processing section 301 of circuitry 300 may include at least one, and in this embodiment, two serial-to-parallel converters 306 and 308, retimer circuits 307 and 309, non-elastic, fixed size (e.g., 1024 kilobytes in size) FIFO buffer memory 344, and protocol logic section 324. The second processing section 303 in circuitry 300 may comprise data processing logic 346.

The converters 306, 308 in the first processing section 301 are configured to receive respective serial bit streams 302, 304 from respective processing sections (not shown) in a single respective host/disk controller (e.g., host controller 24) that is coupled to the memory board 100A. Each of these streams 302, 304 may comprise user data and related control information of the types described above. The stream 302 may be transmitted from the host controller 24 at a serial bit transmission rate set by a first transmission clock signal. The stream 304 may be transmitted from the host controller 24 at a serial bit transmission rate set by a second transmission clock signal.

Although for purposes of describing this embodiment of the present invention, the first and second transmission clock signals may be logically thought of as constituting different clock signals, in actuality, the rate at which the streams 302 and 304 may be initially transmitted from the controller 24 may be set by a single transmission clock signal generated in the controller 24; however, as received by the memory board 100A, the streams 302 and 304 may be sufficiently out of synchronization and/or phase with respect to each other (e.g., as a result of relatively minor differences in the respective lengths and/or characteristics of the respective transmission paths used to carry the streams 302 and 304 to the converters 306, 308) to justify considering the streams 302 and 304 as being transmitted at rates set by two different clock signals, respectively. Each of the streams 302, 304, as transmitted by the controller 24 and received by the converters 306, 308, respectively, may encode the information contained therein in accordance with a conventional 8 bit/10 bit encoding scheme well-known to those skilled in the art.

As the converter 306 receives the stream 302 from the controller 24, the converter 306 converts the stream 302, using conventional 8 bit/10 bit decoding and serial-to-parallel conversion techniques, into a series of corresponding parallel words; each of these words may be one byte in size. The converter 306 includes clock signal recovery circuitry 326 that is configured to use conventional techniques to determine from the stream 302 the first transmission clock signal, and to generate and output to a first retimer circuit 307 a clock signal 330 that may be identical to the first transmission clock signal. The converter 306 may be configured to output via the outputs 310 and 312 the parallel words converted from the stream 302 by the converter 306, using an "interleaved" or "staggered" output pattern, such that at a first rising edge of the clock signal 330 the first such parallel word so converted by the converter 306 may be output via the first output 310, at a first rising edge of another clock signal generated by the converter 306 (having the same period as, but being 180 degrees out of phase relative to, the clock signal 330) the second such parallel word so converted by the converter 306 may be output via the second output 312, at the next succeeding rising edge of the clock signal 330 the third such parallel word so converted by the converter 306 may be output via the first output 310, and so forth, according to the foregoing pattern, for all of the parallel words so converted by the converter 306 from the stream 302.

Retimer 307 receives the byte-sized parallel words output from the converter 306 via the outputs 310 and 312. Using conventional techniques, the retimer 307 concatenates the first respective word that it receives via output 310 with the first respective word that the retimer 307 receives via output 312 to generate a first respective double word (i.e., a parallel word that is 16 bits in length), the retimer 307 concatenates the second respective word that the retimer 307 receives via output 310 with the second respective word that the retimer 307 receives via the output 312 to generate second respective double word, and so forth, and outputs, at respective, successive rising edges of the clock signal 330, the respective double words so formed to the protocol logic section 324 via output 318.

As the converter 308 receives the stream 304 from the controller 24, the converter 308 converts the stream 304, using conventional 8 bit/10 bit decoding and serial-to-parallel conversion techniques, into a series of corresponding parallel words; each of these words may be one byte in size. The converter 308 includes clock signal recovery circuitry 328 that is configured to use conventional techniques to determine from the stream 304 the second transmission clock signal that was generated in the controller 24, and to generate and output to a second retimer circuit 309 a clock signal 332 that may be identical to the second transmission clock signal. The converter 308 is configured to output via the outputs 314 and 316 the parallel words converted from the stream 304 by the converter 308, using an "interleaved" or "staggered" output pattern, such that at a first rising edge of the clock signal 332 the first such parallel word so converted by the converter 308 may be output via the first output 314, at a first rising edge of another clock signal generated by the converter 308 (having the same period as, but being 180 degrees out of phase relative to, the clock signal 332) the second such parallel word so converted by the converter 306 may be output via the second output 316, at the next succeeding rising edge of the clock signal 332 the third such parallel word so converted by the converter 308 may be output via the first output 314, and so forth, according to the foregoing pattern, for all of the parallel words so converted by the converter 308 from the stream 304.

Retimer 309 receives the byte-sized parallel words output from the converter 308 via the outputs 314 and 316. Using conventional techniques, the retimer 309 concatenates the first respective word that it receives via output 314 with the first respective word that the retimer 309 receives via output 316 to generate a first respective double word (i.e., a parallel word that is 16 bits in length), the retimer 309 concatenates the second respective word that the retimer 309 receives via output 314 with the second respective word that the retimer 309 receives via the output 316 to generate second respective double word, and so forth, in accordance with this pattern, and outputs, at respective, successive rising edges of the clock signal 332, the respective double words so formed to the protocol logic section 324 via output 320.

Protocol logic section 324 receives from the retimer circuits 307, 309 the respective double words output via the outputs 318, 320, respectively. The protocol logic section 324 is configured to output to the FIFO memory 344, at successive rising edges of the clock signal 330, the two respective double words received via the outputs 318, 320 during the last respective preceding cycle of the clock signal 330; prior to being received by the memory 344, these respective double words are examined by the protocol logic section 324, and in addition to performing other operations described herein, the logic section 324 recognizes any signaling semaphores comprised in these respective double words and eliminates/filters any such signaling semaphores from these respective double words, so as to cause the double words that are received by the memory 344 to be devoid of signaling semaphores. The double words that are received by the memory 344 are collectively and/or singly symbolically shown in FIG. 5, and referred to herein, as the block referenced by numeral 342.

Prior to being received by the memory 344, each respective double word 342 is examined by the protocol logic section 324, and the section 324 generates and provides to the memory 344, for each such respective double word 342, a respective identification code/value 340 that identifies the respective type of information that is represented by the respective word 342. That is, the logic section 324 may be preprogrammed with memory operation protocol information sufficient to permit the logic section 324 to be able to recognize and identify, based upon the memory operation protocol information, the specific types of respective user data or respective related control information embodied in or represented by the respective double words 342. For example, this memory operation protocol information may identify the respective memory operations that may be validly commanded by the host/disk controllers to be performed by the memory board 100A, the respective sequences of user data and related control information (as well as, the respective required types of such related control information) that must be transmitted to the memory board 100A in order to cause the memory board 100A to carry out these respective memory operations, etc. The logic section 324 may examine each respective double word 342 received from the outputs 318 and 320 and, based upon this examination of the respective double word 342, the types and sequence of information represented by respective data words previously output to section 324 from outputs 318 and 320 and examined by the logic section 324, and the memory operation protocol information, the logic section 324 may generate and provide to the memory 344, simultaneously with the delivery of the respective double word 342 to the memory 344, a respective identification code/value that may identify whether the respective double word represents respective user data or respective related control information, and if the respective double word represents respective related control information, the respective identification code/value may also uniquely identify the specific type/classification of the respective related control information. The identification codes/values that may be generated and provided to the memory 344 by the logic section 324 are collectively and/or singly symbolically shown in FIG. 5 as the block referenced by the numeral 340.

When the memory 344 receives a respective double word 342 and a respective identification code 340 that identifies the respective type of information represented by the respective double word 342, the memory 344 concatenates the respective double word 342 and the respective identification code 340, and stores them as a single respective entry (e.g., entry 352) at a single respective memory location in the memory 344; thus, as stored in the memory 344, the single respective entry 352 comprises two respective fields 350 and 351 that respectively contain a respective double word 342 and a respective identification code 340 that identifies the respective type of information represented by that respective double word 342. The memory 344 receives and stores, in accordance with a timing set by the clock signal 330, the respective double words 342 and the respective identification codes 340 that identify the respective double words 342.

It should be understood that, at any given time, the information being transmitted to the memory board 100A via the streams 302 and 304 may relate to two different respective memory operations to be performed by the memory board 100A. Accordingly, the protocol logic section 324 may be configured to transmit the double words 342 to the memory 344 in such a way (e.g., via different respective portions of a data bus coupling the section 324 to the memory 344) that the memory 344 may be able to determine which of the double words 342 were generated from the stream 302 and which of the double words 342 were generated from the stream 304. The memory 344 may be configured to implement and maintain two different logical FIFO queues (not shown): a first logical FIFO queue and a second logical FIFO queue. The first logical FIFO queue may store entries comprising respective double words 342 generated from the stream 302 and the respective identification codes 340 that identify the respective information represented by such double words. The second logical FIFO queue may store entries comprising respective double words 342 generated from the stream 304 and the respective identification codes 340 that identify the respective information represented by such double words. In accordance with the FIFO queuing structure of the first logical queue, the respective entries in the first logical queue may be stored by the memory 344 in the first logical queue in a respective sequence order that corresponds to the sequence order in which the respective double words comprised in the respective entries in the first logical queue were received by the memory 344, and also such that the respective entries in the first logical queue may be retrieved from the memory 344 in the same order in which they were stored in the first logical queue. Similarly, in accordance with the FIFO queuing structure of the second logical queue, the respective entries in the second logical queue may be stored by the memory 344 in the second logical queue in a respective sequence order that corresponds to the sequence order in which the respective double words comprised in the respective entries in the second logical queue were received by the memory 344, and also such that the respective entries in the second logical queue may be retrieved from the memory 344 in the same order in which they were stored in the second logical queue.

Data processing logic section 346 is configured to retrieve from the memory 344, in the same order in which they were stored by the memory 344 in the first and second logical queues, the respective entries stored in the first and second logical queues. The logic 346 may be configured to retrieve these entries from the first and second queues at a rate governed by a clock signal (not shown) that may be generated internally in the memory board 100A and may have a different frequency from the frequency of clock signal 330; thus, the logic 346 may operate in a different clock domain (i.e., clock domain B) from the clock domain (i.e., clock domain A) in which the processing section 301 may operate.

When a respective entry (e.g., entry 352) from a respective logical queue (i.e., either the first or the second logical queue in memory 344) is retrieved by the logic 346 from the memory 344, the logic 346 may parse the respective entry 352 in accordance with respective fields 350 and 351 of the respective entry 352 to retrieve therefrom the respective double word 352 and the respective identification code 340 comprised in the respective entry 352. Based upon respective identification codes 340 and respective double words 342 retrieved from successive entries in the respective first and second logical queues, the types and sequence of information represented by the respective data words 342 previously retrieved from the queues, and memory operation protocol information that may be preprogrammed into the logic 346, the control logic 346 may determine the memory operations that the controller 24 has commanded the memory board 100A to perform and may control the crossbar switching circuitry comprised in the ASIC 250 to cause the memory board to carry out such memory operations. That is, as stated previously, the ASIC 250 that comprises the circuitry 300 also comprises crossbar switching circuitry. The data processing logic 346 may be configured to control the crossbar switching circuitry comprised in the ASIC 250 so as to cause the memory board 100A to carry out the memory operations commanded by the controller 24, as well as other operations, as described in e.g., commonly-owned, U.S. patent application Ser. No. 09/745,814, entitled, "Data Storage System Having Crossbar Switch With Multi-Staged Routing," filed Dec. 21, 2000 now U.S. Pat. No. 6,636,933, and commonly-owned, U.S. patent application Ser. No. 09/960,177, entitled "Memory System And Method Of Using Same," filed Sep. 21, 2001 now U.S. Pat No. 6,578,126; these co-pending U.S. Patent Applications are hereby incorporated by reference herein in their entireties.

Thus, it is evident that there has been provided, in accordance with the present invention, a technique for transmitting data across asynchronous clock domains that fully satisfies the aims and objectives, and achieve the advantages, hereinbefore set forth. The terms and expressions which have been employed in the subject application are used as terms of description and not of limitation, and there is no intention, in the use of such terms and expressions, of excluding any equivalents of the features shown and described or portions thereof, but it is recognized that various modifications are possible within the scope of the invention as claimed.

For example, although illustrative embodiments of the present invention have been described in connection with use in a network data storage system that comprises a messaging network 14 that facilitates communications between the host controllers and the disk controllers, and a point-to-point data transfer network system that comprises links 40, 42, 44, and 46, if appropriately modified, these embodiments of the present invention may instead be used in connection with other types of network data storage systems, e.g., that utilize a redundant bus system of the type described in commonly-owned, co-pending U.S. patent application Ser. No. 09/796,259, filed Feb. 28, 2001, entitled "Error Condition Handling".

Other modifications are also possible. For example, in memory board 100A, the circuitry 300 may be replicated (i.e., in the application specific integrated circuits 250, 252, 254, and 256) in the circuitry 200 such that, for each of the host/disk controllers that is coupled to the circuitry 200 in board 100A, a respective replica of the first processing section 301 of circuitry 300 may exist in the circuitry 200, each such replica of the processing section 301 may be coupled to a respective host/disk controller that is coupled to the circuitry 200, and the replicated first processing sections in each such respective application specific integrated circuit may be coupled to a single respective data processing section 346 configured to retrieve and process the entries stored in the FIFO memories comprised in such replicated first processing sections. Alternatively, if appropriately modified in ways apparent to those skilled in the art, in memory board 100A, the circuitry 300 may be replicated (i.e., in the application specific integrated circuits 250, 252, 254, and 256) in the circuitry 200 such that, for each of the host/disk controllers that is coupled to the circuitry 200 in board 100A, a respective replica of the entire circuitry 300 may exist in the circuitry 200, and each such replica of the circuitry 300 may be coupled to a respective host/disk controller that is coupled to the circuitry 200. Accordingly, the present invention should be viewed broadly as encompassing all modifications, variations, alternatives and equivalents as may be encompassed by the hereinafter appended claims.

What is claimed is:

1. System for use in transmitting data and related control information from a first processing section to a second processing section, the first processing section being in a first clock domain, the second processing section being in a second clock domain, the system comprising:

a first logic section that may generate respective identification information that may be associated with and used to identify respective types of information represented by respective data and respective related control information; and memory that may receive and store, at a first clock rate used in the first clock domain, the respective data and the respective related control information, the memory also storing, in association with the respective data and the respective related control information, the respective identification information generated by the first logic section that may be used to identify the respective types of information represented by the respective data and the respective related control information stored in the memory, the memory being configured to permit retrieval, at a second clock rate used in the second clock domain, of the respective data, the respective related control information, and the respective identification information stored in the memory.

2. The system of claim 1, wherein:

the respective data, when stored in the memory, is concatenated with the respective identification information that identifies the respective type of information represented by the respective data; and the respective related control information, when stored in the memory, is concatenated with the respective identification information that identifies the respective type of information represented by the respective related control information.

3. The system of claim 1, wherein a second logic section in the second clock domain is configured to determine, based upon the respective identification information retrieved from the memory, respective further processing of the respective data and the respective control information retrieved from the memory.

4. The system of claim 3, wherein the respective identification information may indicate one of a respective type of control information, a respective type of address information, and user data.

5. The system of claim 1, wherein the first processing section includes at least one converter that may convert at least one bit stream into parallel words, the parallel words comprising the respective data and the respective related control information.

6. The system of claim 1, wherein the first processing section includes a plurality of converters that may convert respective bit streams into parallel words, the parallel words comprising the respective data and the respective related control information.

7. The system of claim 6, wherein the first processing section also comprises retimer circuitry that may be used to synchronize, based upon the first clock rate, transmission of the parallel words to the memory.

8. The system of claim 1, wherein the memory comprises a first-in-first-out memory.

9. The system of claim 7, wherein:

the plurality of converters comprises a first converter and a second converter;

the retimer circuitry comprises a first retimer circuit and a second retimer circuit;

the first retimer circuit is coupled to the first converter; and the second retimer circuit is coupled to the second converter.

10. The system of claim 9, wherein:

the first converter receives a first bit stream;

the second converter receives a second bit stream;

the first converter is configured to generate, based upon the first bit stream, a first clock signal;

the second converter is configured to generate, based upon the second bit stream, a second clock signal;

the first retimer circuit receives the first clock signal; and the second retimer circuit receives the second clock signal.

11. Method for transmitting data and related control information from a first processing section to a second processing section, the first processing section being in a first clock domain, the second processing section being in a second clock domain, the method comprising:

using a first logic section to generate respective identification information that may be associated with and used to identify respective types of information represented by respective data and respective related control information; and receiving and storing in a memory, at a first clock rate used in the first clock domain, the respective data and the respective related control information, the memory also storing, in association with the respective data and the respective related control information, the respective identification information generated by the first logic section that may be used to identify the respective types of information represented by the respective data and the respective related control information stored in the memory, the memory being configured to permit retrieval, at a second clock rate used in the second clock domain, of the respective data, the respective related control information, and the respective identification information stored in the memory.

12. The method of claim 11, wherein:

the respective data, when stored in the memory, is concatenated with the respective identification information that identifies the respective type of information represented by the respective data; and the respective related control information, when stored in the memory, is concatenated with the respective identification information that identifies the respective type of information represented by the respective related control information.

13. The method of claim 11, wherein a second logic section in the second clock domain is configured to determine, based upon the respective identification information retrieved from the memory, respective further processing of the respective data and the respective control information retrieved from the memory.

14. The method of claim 13, wherein the respective identification information may indicate one of a respective type of control information, a respective type of address information, and user data.

15. The method of claim 1, wherein the first processing section includes at least one converter that may convert at least one bit stream into parallel words, the parallel words comprising the respective data and the respective related control information.

16. The method of claim 11, wherein the first processing section includes a plurality of converters that may convert respective bit streams into parallel words, the parallel words comprising the respective data and the respective related control information.

17. The method of claim 16, wherein the first processing section also comprises retimer circuitry that may be used to synchronize, based upon the first clock rate, transmission of the parallel words to the memory.

18. The method of claim 11, wherein the memory comprises a first-in-first-out memory.

19. The method of claim 17, wherein:

the plurality of converters comprises a first converter and a second converter;

the retimer circuitry comprises a first retimer circuit and a second retimer circuit;

the first retimer circuit is coupled to the first converter; and the second retimer circuit is coupled to the second converter.

20. The method of claim 19, wherein:

the first converter receives a first bit stream;

the second converter receives a second bit stream;

the first converter is configured to generate, based upon the first bit stream, a first clock signal;

the second converter is configured to generate, based upon the second bit stream, a second clock signal;

the first retimer circuit receives the first clock signal; and the second retimer circuit receives the second clock signal.

* * * * *